(12) United States Patent
Patel et al.

(10) Patent No.: US 6,328,333 B1
(45) Date of Patent: *Dec. 11, 2001

(54) PILLAR TRIM FOR INFLATABLE RESTRAINT SYSTEM

(75) Inventors: Rasik N. Patel, Canton; Glen Paul Ursaki, Fraser, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/468,393

(22) Filed: Dec. 20, 1999

(51) Int. Cl.$^7$ .................................................. B60R 21/22
(52) U.S. Cl. ..................... 280/730.2; 280/730.1; 280/751
(58) Field of Search ................... 280/751, 730.1, 280/730.2, 728.13

(56) References Cited

U.S. PATENT DOCUMENTS

| | | |
|---|---|---|
| 5,238,263 | 8/1993 | Sinnhuber . |
| 5,273,309 | 12/1993 | Lau et al. . |
| 5,382,051 | 1/1995 | Glance . |
| 5,560,672 | 10/1996 | Lim et al. . |
| 5,580,116 | 12/1996 | Patel et al. . |
| 5,641,195 | 6/1997 | Patel et al. . |
| 5,709,407 | 1/1998 | Stephens et al. . |
| 5,720,510 | 2/1998 | Daniel et al. . |
| 6,142,506 | * 11/2000 | Patel et al. ................... 280/728.2 |

FOREIGN PATENT DOCUMENTS

| | | |
|---|---|---|
| 0 841 221 A1 | 5/1998 | (EP) . |
| 0 872 390 A1 | 10/1998 | (EP) . |
| 3-276844 | 12/1991 | (JP) . |
| 10-138861 | 5/1998 | (JP) . |
| 11-301368 | 11/1999 | (JP) . |

* cited by examiner

*Primary Examiner*—Lanna Mai
*Assistant Examiner*—Christopher Buchanan
(74) *Attorney, Agent, or Firm*—David B. Kelley

(57) ABSTRACT

A pillar trim is provided for an inflatable restraint mounted to a pillar of a motor vehicle. The pillar trim includes a body fixedly mounted to the pillar and a plurality of energy absorbing ribs spaced relative to one another along the body and disposed adjacent to the pillar when the pillar trim is mounted thereto. The energy absorbing ribs are spaced from the pillar to form a packaging space for the inflatable restraint to be stowed therein. The pillar trim also includes a notch extending through the energy absorbing ribs and into the body to deflect and bend to form a desired exit opening in the body when the inflatable restraint is inflated to allow the inflatable restraint to deploy therethrough.

20 Claims, 3 Drawing Sheets

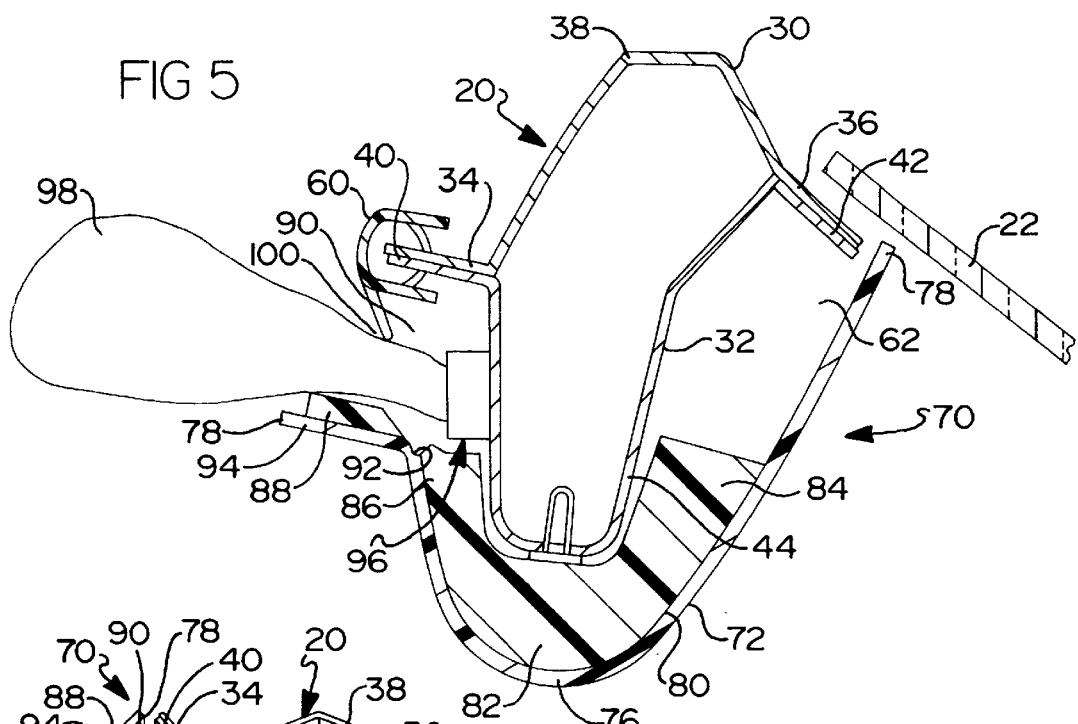
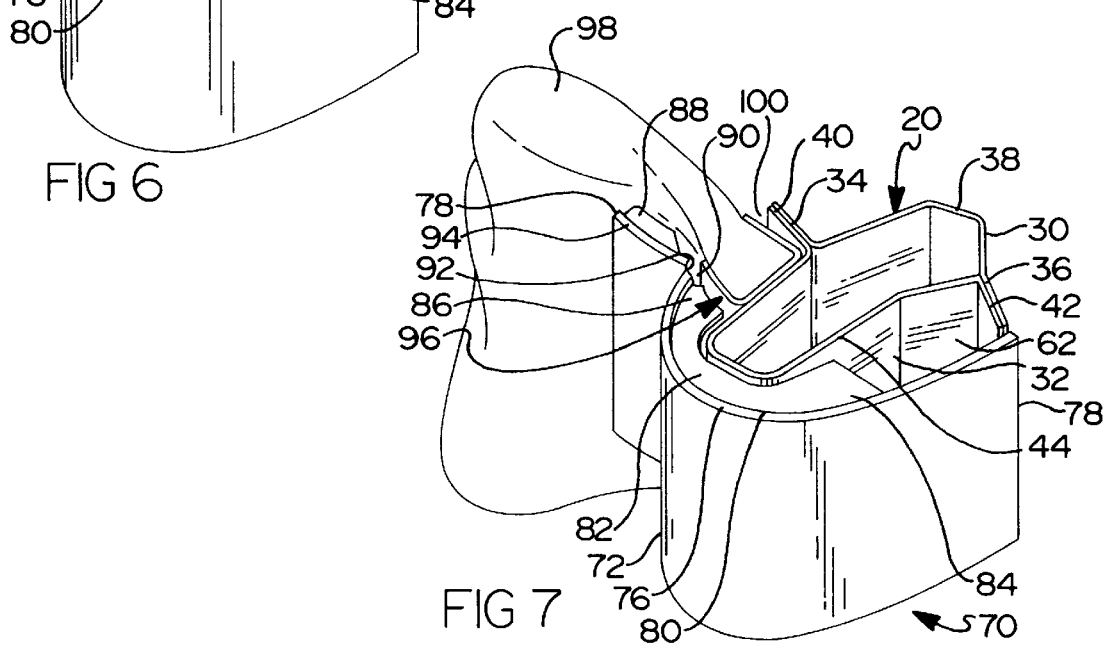

PILLAR TRIM FOR INFLATABLE RESTRAINT SYSTEM

BACKGROUND OF THE INVENTION

1. Field of the Invention

The present invention relates generally to inflatable restraints and, more specifically, to a pillar trim for an inflatable restraint system in a motor vehicle.

2. Description of the Related Art

A particular type of inflatable restraint for an occupant in a motor vehicle is commonly referred to as an air bag. The air bag is stored in the motor vehicle in an uninflated condition. When the motor vehicle experiences a collision-indicating condition of at least a predetermined threshold level, gas is directed to flow into the air bag from a gas producing source. The gas inflates the air bag to an extended condition in which the air bag extends into the occupant compartment of the motor vehicle. When the air bag is inflated into the occupant compartment, it restrains movement of the occupant to help protect the occupant from forcefully striking parts of the motor vehicle as a result of the collision.

The air bag is typically mounted in the vehicle as a part of an air bag module. In addition to the air bag, the air bag module includes an inflator and a reaction canister. The inflator is source of gas for inflating the air bag. The reaction canister contains the air bag and the inflator, and has a deployment opening through which the air bag emerges from the reaction canister when it is being inflated.

Typically, a deployment door extends over the deployment opening in the reaction canister to conceal the air bag and the other parts of the air bag module from the occupant compartment. The deployment door may be a part of a panel such as an instrument panel of the motor vehicle.

When the inflator is actuated, the reaction canister directs the gas to flow from the inflator into the air bag. As the gas enters the air bag, it moves the air bag outward from the reaction canister through the deployment opening and forcefully against the deployment door. A closure portion of the deployment door is ruptured by the force of the fluid pressure in the air bag. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the reaction canister through the deployment opening and into the occupant compartment.

It is known to provide a pillar trim inside the occupant compartment for a pillar on a vehicle body of the motor vehicle. Examples of such pillar trims are disclosed in U.S. Pat. Nos. 5,580,116 and 5,641,195 to Patel et al. In these patents, the pillar trim includes a body fixedly mounted to a pillar having a plurality of energy absorbing ribs spaced relative to one another along the body and disposed adjacent to the pillar when the pillar trim is mounted thereto. These ribs are relatively stiff and do not allow an air bag to deploy through the pillar trim.

Therefore, there is a need in the art to deploy an air bag from a pillar and roof inside the occupant compartment of the motor vehicle. Also, there is a need in the art to provide a pillar trim that has packaging space for the air bag and air bag deployment without detaching from vehicle structure of the motor vehicle.

SUMMARY OF THE INVENTION

Accordingly, the present invention is a pillar trim for an inflatable restraint mounted to a pillar of a motor vehicle. The pillar trim includes a body fixedly mounted to the pillar and a plurality of energy absorbing ribs spaced relative to one another along the body and disposed adjacent to the pillar when the pillar trim is mounted thereto. The energy absorbing ribs are spaced from the pillar to form a packaging space for the inflatable restraint to be stowed therein. The pillar trim also includes a notch extending through the energy absorbing ribs and into the body to deflect and bend to form a desired exit opening in the body when the inflatable restraint is inflated to allow the inflatable restraint to deploy therethrough.

One feature of the present invention is that a pillar trim is provided for an inflatable restraint system in a motor vehicle. Another feature of the present invention is that the pillar trim covers an inflatable restraint or air bag packaged on the A-pillar and the roof surface and reduces deployment time of the inflatable restraint. Yet another feature of the present invention is that the pillar trim provides a path for easier deployment of a side impact or rollover inflatable restraint when the inflatable restraint is packaged behind the pillar trim. Still another feature of the present invention is that the pillar trim provides a cost effective pillar trim design that can be made with existing tooling without degrading packaging and head impact performance. A further feature of the present invention is that the pillar trim assists in deploying a curtain type inflatable restraint packaged behind the pillar trim while meeting head impact requirements without reducing deployment time and, after deployment of the inflatable restraint, stays on the pillar without fragmenting the pillar trim. Yet a further feature of the present invention is that the pillar trim provides packaging space and inflatable restraint deployment capability from the pillar and roof to provide a cushion for the occupant in case of a side impact or rollover condition.

Other features and advantages of the present invention will be readily appreciated, as the same becomes better understood after reading the subsequent description when considered in connection with the accompanying drawings.

BRIEF DESCRIPTION OF THE DRAWINGS

FIG. 5 is a view similar to FIG. 4 illustrating deployment of an inflatable restraint of the inflatable restraint system through the pillar trim.

FIG. 6 is a perspective view of the pillar trim and inflatable restraint system of FIG. 4.

FIG. 7 is a view similar to FIG. 6 illustrating deployment of the inflatable restraint of the inflatable restraint system through the pillar trim.

DESCRIPTION OF THE PREFERRED EMBODIMENT(S)

Figure 1:
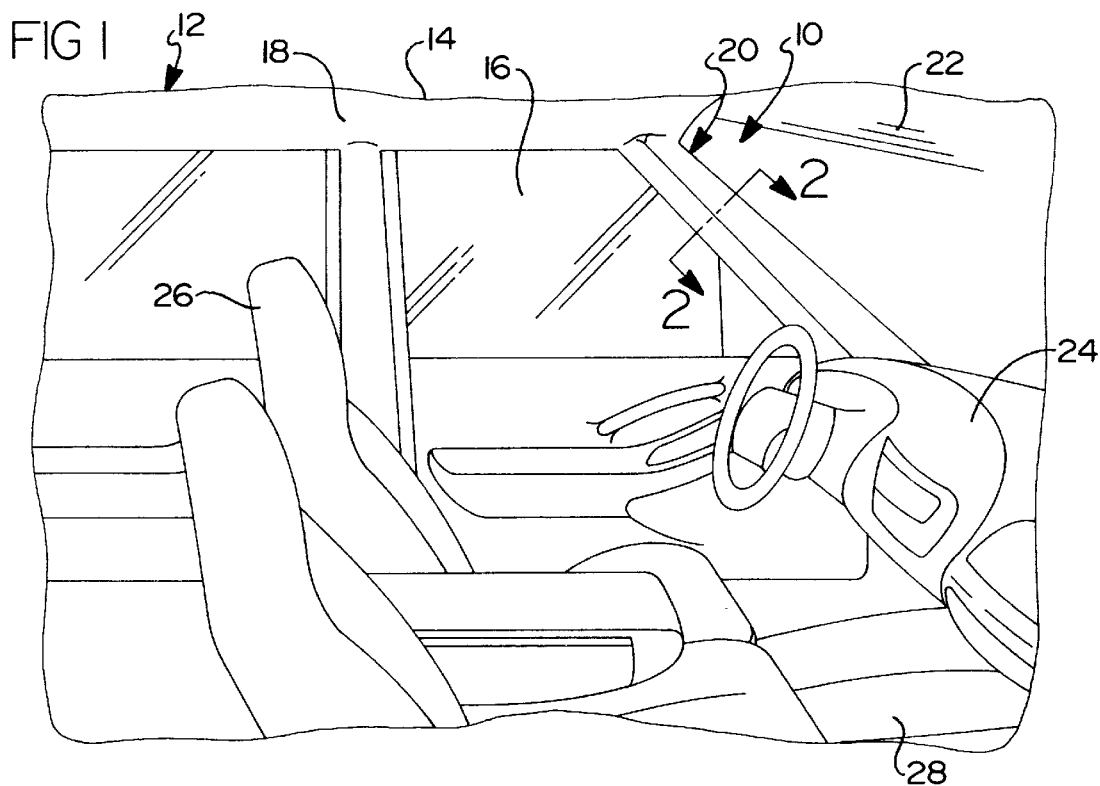
FIG. 1 is a perspective view of a pillar trim illustrated in operational relationship with a motor vehicle.
Figure 2:
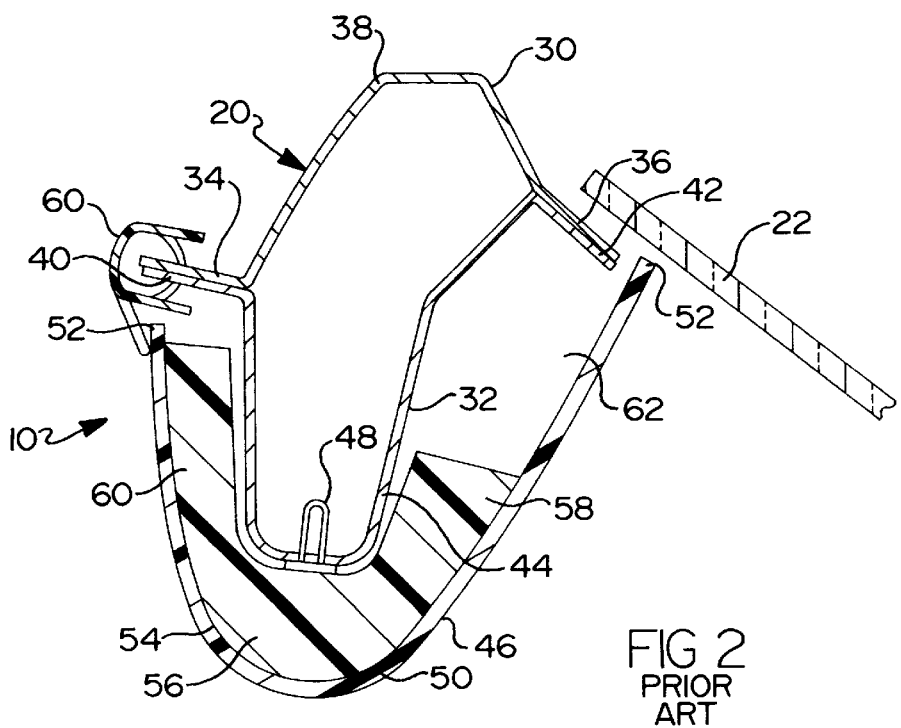
FIG. 2 is a sectional view taken along line 2—2 of FIG. 1.

Referring to the drawings and in particular FIGS. 1 and 2, one embodiment of a conventional or prior art pillar trim 10 is illustrated in operational relationship with a motor vehicle, generally indicated at 12. The motor vehicle 12 includes a vehicle body 14 forming an occupant compartment 16. The vehicle body 14 includes a roof 18 and a pair of A-pillars, generally indicated at 20, spaced laterally and extending downwardly and forwardly at an angle from a forward end of the roof 18. The vehicle body 14 also includes a windshield or glass panel 22 extending between the A-pillars 20. The motor vehicle 12 includes an instrument panel 24 extending laterally across the occupant compartment 18 below the windshield 22. The motor vehicle 12 also includes at least one seat 26 mounted to a floor 28 of the vehicle body 14 and spaced longitudinally from the instrument panel 24. It should be appreciated that the pillar trim 10 may be employed with either the A, B, C and D pillars as well as side and roof rails of the vehicle body 14 to present an aesthetically pleasing appearance in the occupant compartment 16 of the motor vehicle 12, to smooth contours and to cover structural load bearing components of the motor vehicle 12. It should be appreciated that the motor vehicle 12 is conventional and known in the art.

Referring to FIGS. 1 and 2, the A-pillar 20 includes an exterior panel 30 and an interior panel 32. The exterior panel 30 has first and second peripheral flange portions 34 and 36 and an outwardly concave portion 38 extending between the peripheral flange portions 34 and 36. The interior panel 32 includes first and second peripheral flange portions 40 and 42 positioned in facing relationship to the first and second peripheral flange portions 34 and 36, respectively, of the exterior panel 30. The interior panel 32 has an inwardly concave portion 44 extending between the peripheral flange portions 40 and 42. The exterior and interior panels 30 and 32 are preferably fabricated as metal stampings. The peripheral flange portions 34,36 and 40,42 are joined together by suitable means such as welding.

The pillar trim 10 includes a body 46 fixedly mounted to the A-pillar 20 and extending along the entire length thereof. To that end, the pillar trim 10 includes a fastening mechanism, which in this case, is a plurality of tabs or clips 48 disposed along a length of the body 46 and a plurality of slots or sockets (not shown) on the interior panel 32 of the A-pillar 20 and corresponding to the tabs 48. It should be appreciated that any suitable fastening mechanism for the application may be employed.

The body 46 conforms to the A-pillar 20 to be covered by the pillar trim 10 and, in this example, is substantially U-shaped in cross-section and includes a central portion 50 and a pair of edges 52 with the central portion 50 extending between the edges 52. The edges 52 extend toward the A-pillar 20. However, it should be appreciated that the edges 52 may extend at any angle to the A-pillar 20 necessary to carry out the purpose of the pillar trim 10. The body 46 also includes a plurality of energy absorbing ribs 54 spaced relative to one another along the body 46 and disposed adjacent to the A-pillar 20 when the pillar trim 10 is mounted thereto. The energy absorbing ribs 54 have a base portion 56 extending from the central portion 50 of the body 46. The energy absorbing ribs 54 also have a first leg portion 58 extending from the base portion 56 and the body 46 toward the peripheral flange portions 36,42 and a second leg portion 60 extending from the base portion 56 and the body 46 toward the peripheral flange portions 34,40. The second leg portion 60 extends toward the peripheral flange portions 34,40 a distance greater than the first leg portion 58 extends toward the peripheral flange portions 36,42. The body 46 is formed as a one-piece, plastic, injection molded part having the energy absorbing ribs 54 being integral, unitary and molded thereto. It should be appreciated that the body 46 opposite the A-pillar 20 may be covered or wrapped in vinyl, cloth, leather or any other suitable material. It should also be appreciated that a sealing member 60 may be secured to the joined ends of the peripheral flange portions 34, 40 of the exterior and interior panels 30 and 32. It should further be appreciated that an energy absorbing chamber 62 may be defined between an interior surface of the pillar trim 10 and an exterior surface of the interior panel 32. It should still further be appreciated that, up to this point in the description, the pillar trim 10 is conventional and known in the art.

Referring to FIGS. 3 through 7, a pillar trim 70, according to the present invention, is shown for the A-pillar 20. The pillar trim 70 includes a body 72 fixedly mounted to the A-pillar 20 and extending along the entire length thereof. To that end, the pillar trim 70 includes a fastening mechanism, which in this case, is a plurality of tabs or clips 74 disposed along a length of the body 72 and a plurality of slots or sockets (not shown) on the interior panel 32 of the A-pillar 20 and corresponding to the tabs 74. It should be appreciated that any suitable fastening mechanism for the application may be employed.

Figure 3:
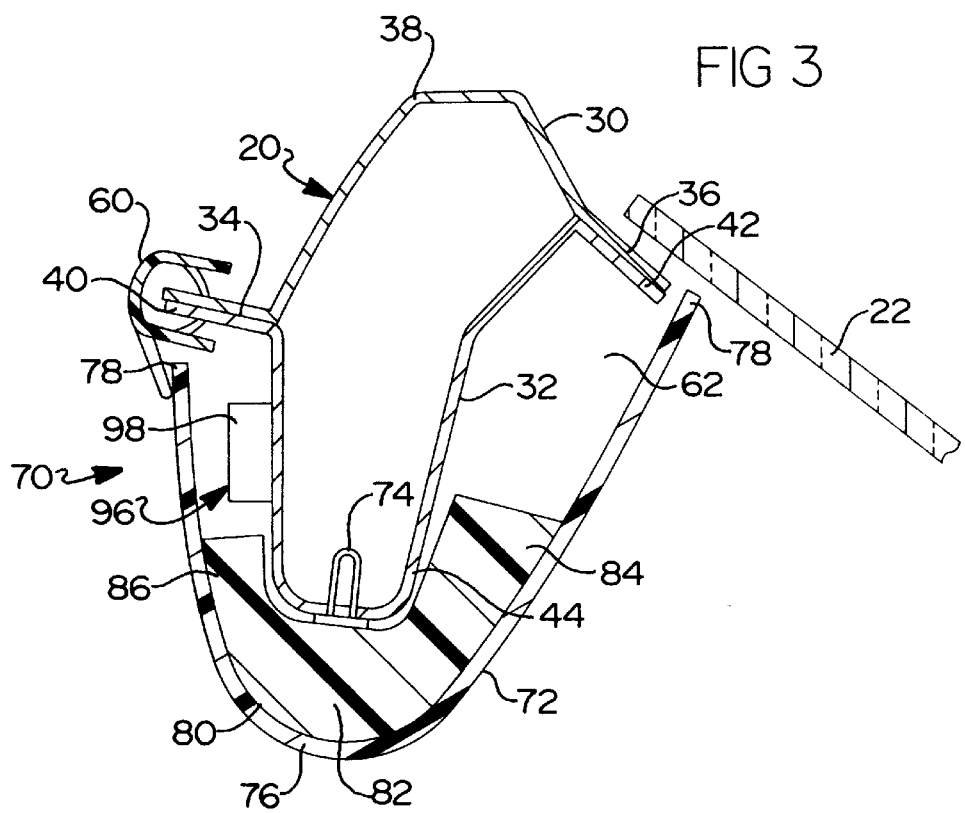
FIG. 3 is a view similar to FIG. 2 of a pillar trim, according to the present invention, for an inflatable restraint system in the motor vehicle of FIG. 1.

The body 72 conforms to the A-pillar 20 to be covered by the pillar trim 70 and, in this example, is substantially U-shaped in cross-section and includes a central portion 76 and a pair of edges 78 with the central portion 76 extending between the edges 78. The edges 78 extend toward the A-pillar 20 at an angle, which may be at any angle to the A-pillar 20 necessary to carry out the purpose of the pillar trim 70. The body 72 includes a plurality of energy absorbing ribs 80 spaced relative to one another along the body 72 and disposed adjacent to the A-pillar 20 when the pillar trim 70 is mounted thereto. The energy absorbing ribs 80 have a base portion 82 extending from the central portion 76 of the body 72. The energy absorbing ribs 80 also have a first leg portion 84 extending from the base portion 82 and the body 72 toward the flange portions 36,42 and a second leg portion 86 extending from the base portion 82 and the body 72 toward the flange portions 34,40. The second leg portion 86 extends toward the flange portions 34,40 a distance less than the first leg portion 84 extends toward the flange portions 36,42 on some of the energy absorbing ribs 80 as illustrated in FIG. 3. However, to strengthen the pillar trim 10, some of the energy absorbing ribs 80 have the second leg portion 86 including a reinforcement portion 88 extending from the body 72 toward the peripheral flange portions 34 and 40 and terminates near the edge 78 of the body 72. The reinforcement portion 88 has a width less than a width of the second leg portion 86 to create a packaging space 90 for a function to be described as illustrated in FIG. 4.

The pillar trim 70 also includes a notch 92 extending though the reinforcement portion 88 and into an interior surface of the body 72. The notch 92 extends at an angle relative to the reinforcement portion 88 and terminates adjacent the second leg portion 86 to form a deployment door 94 for a function to be described. The notch 92 extends axially a predetermined distance to form the deployment door and acts as a weak spot to allow the deployment door 94 to bend outwardly. The notch 92 is generally U-shaped extending into the interior surface of the body 72. The notch 92 is molded into the body 72 without affecting the class "A" outer surface as illustrated in FIG. 4. The body 72 is formed as a one-piece, plastic, injection molded part having the energy absorbing ribs 80 being integral, unitary and molded thereto. It should be appreciated that the body 72 opposite the A-pillar 20 may be covered or wrapped in vinyl, cloth, leather or any other suitable material. It should be appreciated that the energy absorbing chamber 62 may be defined between an interior surface of the pillar trim 70 and an exterior surface of the interior panel 32.

The motor vehicle 12 includes an inflatable restraint system, generally indicated at 96, to provide occupant protection in case of a side impact or rollover condition. The inflatable restraint system 96 includes a curtain type inflatable restraint 98 such as an air bag mounted to the A-pillar 20 behind the pillar trim 70 and an inflatable restraint module (not shown) for inflating the inflatable restraint 98. The inflatable restraint 98 is disposed in the packaging space 90 between the pillar trim 70 and A-pillar 20 for the inflatable restraint 98. The inflatable restraint system 96 includes an inflator (not shown) and a reaction canister (not shown). It should be appreciated that the inflator is the source of inflation fluid or gas for inflating the inflatable restraint 98.

Figure 4:
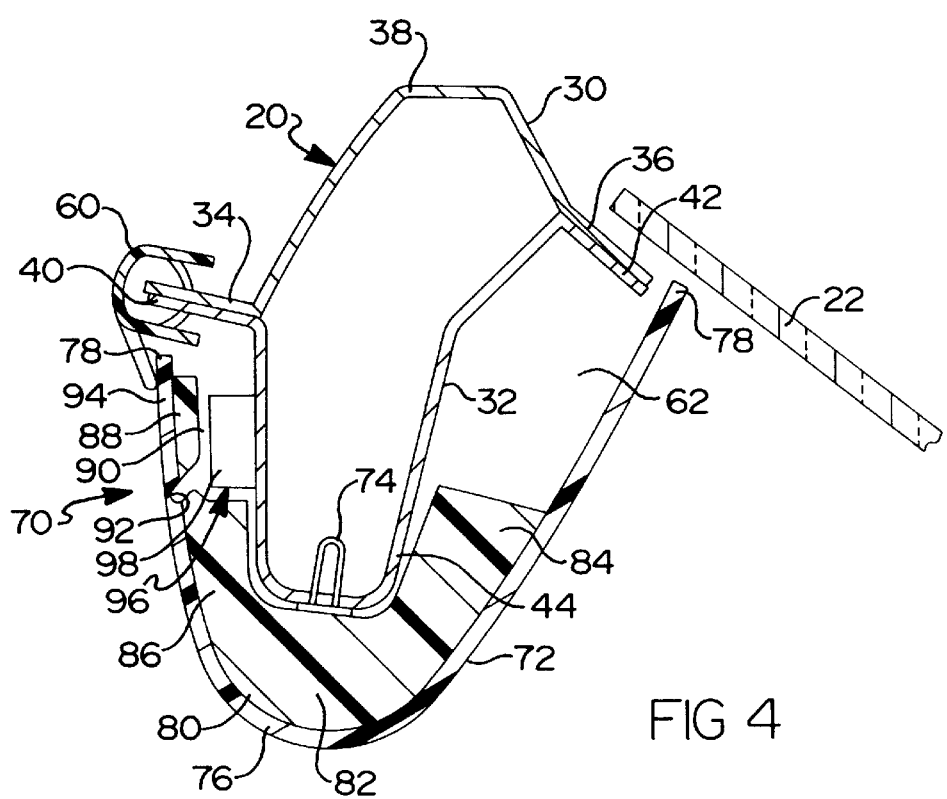
FIG. 4 is a view similar to FIG. 3 of a portion of the pillar trim and inflatable restraint system of FIG. 3.

In operation, the inflatable restraint 98 is stowed in the packaging space 90 of the pillar trim 70 adjacent the A-pillar 20 as illustrated in FIGS. 4 and 6. When the motor vehicle 12 experiences a collision-indicating condition of at least a predetermined threshold level, the inflator is actuated and the reaction canister directs the gas to flow from the inflator into the inflatable restraint 98. As the gas enters the inflatable restraint 98, it moves the inflatable restraint 98 outward from the reaction canister. As the inflatable restraint 98 deploys, it pushes on the deployment door 94 of the pillar trim 70, which easily bends away at the notch 92 as illustrated in FIGS. 5 and 7 to form an opening 100 at the designated exit location and provides a path for the inflatable restraint 98. The inflatable restraint 98 is inflated outward from the opening 100 in the pillar trim 70 to extend into the occupant compartment 16 of the motor vehicle 12 as illustrated in FIGS. 5 and 7. When the inflatable restraint 98 is inflated into the occupant compartment 16, it restrains movement of the occupant to help protect the occupant from forcefully striking parts on the side of the motor vehicle 12 as a result of the collision. It should be appreciated that less force is required to bend the pillar trim 70 during deployment, which reduces deployment time of the inflatable restraint 98. It should also be appreciated that the pillar trim 70 stays attached to the A-pillar 20 during deployment. It should further be appreciated that the pillar trim 70 may accommodate a tether (not shown).

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pillar trim for an inflatable restraint mounted to a pillar of a motor vehicle comprising:
   a body fixedly mounted to the pillar;
   a plurality of energy absorbing ribs extending inwardly from said body and spaced longitudinally relative to one another along said body and disposed adjacent to the pillar when said pillar trim is mounted thereto, said energy absorbing ribs being spaced from the pillar to form a packaging space for the inflatable restraint to be stowed therein; and
   a notch extending through said energy absorbing ribs and into said body to deflect and bend to form a desired exit opening in said body when the inflatable restraint is inflated to allow the inflatable restraint to deploy therethrough.

2. A pillar trim as set forth in claim 1 wherein said energy absorbing ribs have a base portion and a first leg portion extending from said base portion and a second leg portion extending from said base portion, said second leg portion having a length less than said first leg portion.

3. A pillar trim as set forth in claim 1 including a reinforcement portion extending from said second leg portion and terminating near an edge of said body.

4. A pillar trim as set forth in claim 3 wherein said reinforcement portion has a width less than a width of said second leg portion to form said packaging space.

5. A pillar trim as set forth is claim 3 wherein said notch extends through said reinforcement portion and into said body.

6. A pillar trim as set forth in claim 1 wherein notch extends a predetermined distance along said body to form a deployment door adjacent the inflatable restraint.

7. A pillar trim as set forth in claim 1 wherein said body has a pair of edges and a central portion extending between said edges.

8. A pillar trim as set forth in claim 1 wherein said body has a generally U shaped cross section.

9. A pillar trim as set forth in claim 1 wherein said body and said energy absorbing ribs are made of a plastic material.

10. A pillar trim as set forth in claim 1 wherein said body and said energy absorbing ribs are integral, unitary and formed as one-piece.

11. A pillar trim as set forth in claim 1 wherein said notch has a general U shape.

12. A pillar trim as set forth in claim 1 wherein said notch extends at an angle to said body.

13. A pillar trim inflatable restraint system for an occupant seated in a seat comprising:
    a body fixedly mounted to the pillar;
    a plurality of energy absorbing ribs extending inwardly from said body and spaced longitudinally relative to one another along said body and disposed adjacent to the pillar when said pillar trim is mounted thereto, said energy absorbing ribs being spaced from the pillar to form a packaging space therebetween;
    an inflatable restraint stowed in said packaging space; and
    a notch extending through said energy absorbing ribs and into said body to deflect and bend to form a desired exit opening in said body when said inflatable restraint is inflated to allow said inflatable restraint to deploy therethrough.

14. A pillar trim inflatable restraint system as set forth in claim 13 wherein said energy absorbing ribs have a base portion and a first leg portion extending from said base portion and a second leg portion extending from said base portion, said second leg portion having a length less than said first leg portion.

15. A pillar trim inflatable restraint system as set forth in claim 14 including a reinforcement portion extending from said second leg portion and terminating near an edge of said body.

16. A pillar trim inflatable restraint system as set forth in claim 15 wherein said reinforcement portion has a width less than a width of said second leg portion to form said packaging space.

17. A pillar trim inflatable restraint system as set forth in claim 16 wherein said notch extends through said reinforcement portion and into said body.

18. A pillar trim inflatable restraint system as set forth in claim 13 wherein notch extends a predetermined distance along said body to form a deployment door adjacent said inflatable restraint.

19. A pillar trim inflatable restraint system as set forth in claim 13 wherein said body and said energy absorbing ribs are integral, unitary and formed as one-piece.

20. A pillar trim inflatable restraint system for an occupant seated in a seat comprising:

a body fixedly mounted to the pillar;

a plurality of energy absorbing ribs extending inwardly from said body and spaced longitudinally relative to one another along said body and disposed adjacent to the pillar when said pillar trim is mounted thereto, said energy absorbing ribs being spaced from the pillar to form a packaging space therebetween;

an inflatable restraint stowed in said packaging space; and a notch extending a predetermined distance along said body to form a deployment door adjacent said inflatable restraint, said notch extending through said energy absorbing ribs and into said body to deflect and bend to form a desired exit opening in said body when said inflatable restraint is inflated to allow said inflatable restraint to deploy therethrough.

\* \* \* \* \*